July 25, 1933.   T. G. LE CLAIR ET AL   1,919,231
UNBALANCED RATIO RELAY SCHEME
Filed July 31, 1929
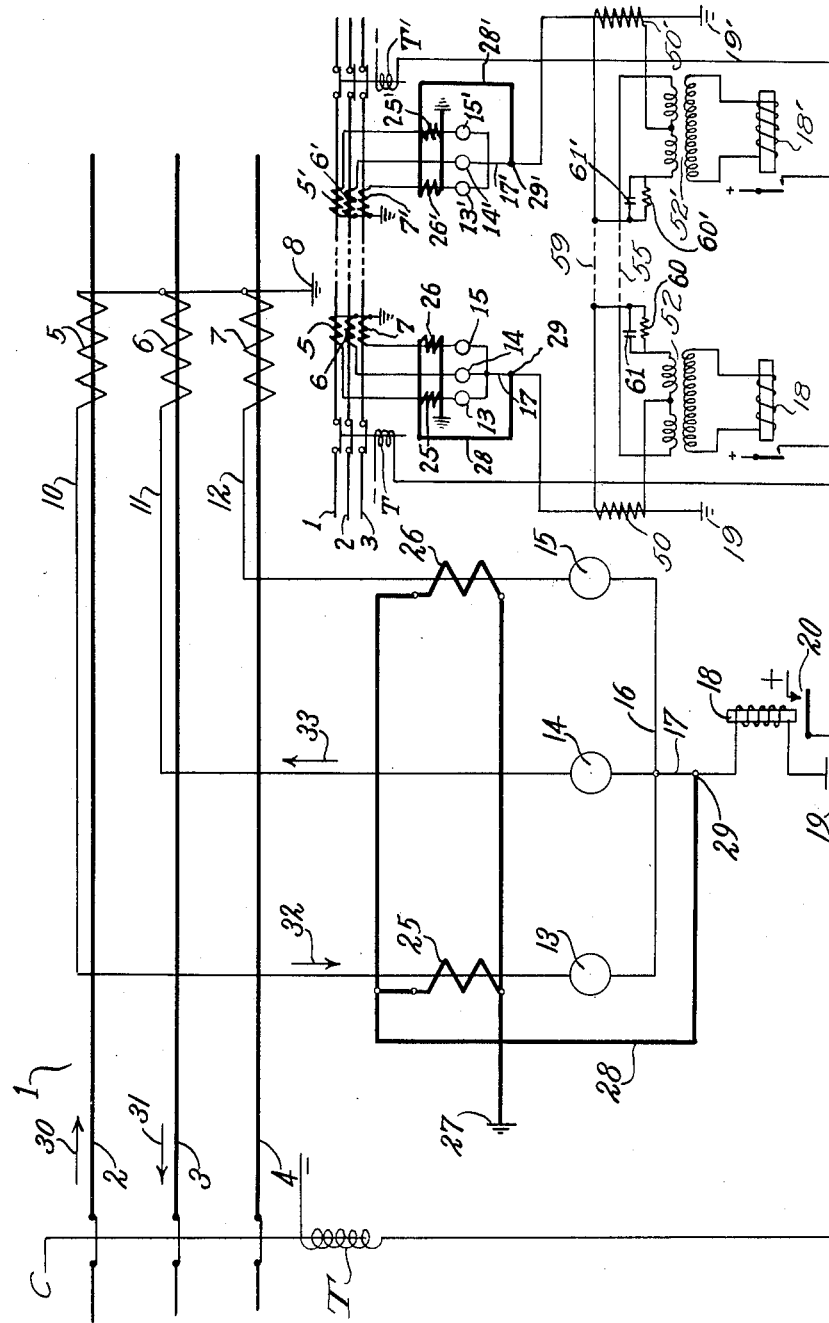
Inventors
Titus G. LeClair
Charles M. Gross Patented July 25, 1933

1,919,231

UNITED STATES PATENT OFFICE

TITUS G. LE CLAIR AND CHARLES M. GROSS, OF CHICAGO, ILLINOIS

UNBALANCED RATIO RELAY SCHEME

Application filed July 31, 1929. Serial No. 382,557.

This invention relates to protective means for electric systems and is particularly concerned with the provision of a protective arrangement for polyphase systems which will involve the use of the minimum number of pilot conductors and will afford the maximum protection. While we have herein shown our invention as applied to a three phase system, to which it is particularly applicable, the invention is not limited thereto, being likewise applicable to systems of other numbers of phases, if desired.

Our present invention involves the use of a single relay for disconnecting a power line from the power system upon the occurrence of a fault on the line. The arrangement is such that the relay will operate upon the occurrence of a fault between any of the phase conductors and ground, or between any two of the phase conductors, or upon the occurrence of a fault involving all three of the conductors.

This result is obtained, in the present invention, by providing a known relay protective circuit, of the kind adapted to protect only against phase to ground faults, with unequal ratio current transformers in the leads from two or more of the line current transformers. As a result of this arrangement, upon the occurrence of a fault from phase to phase, or one involving all three phases, either of which types of faults would ordinarily produce a balanced condition with reference to the relay resulting in the non-operation of the relay, there is produced, in the present case, an unbalanced condition with reference to the relay and the relay operates. The relay is connected, in the usual manner, to operate the oil circuit breaker between the line and its source of power.

Electric measuring instruments of various kinds are generally connected in the current transformer secondaries for indicating the energy flow and it is one of the objects of the present invention to produce an unbalance in the circuit including the secondary sides of the unbalancing current transformers without destroying the balance which is necessary for a correct operation of the instruments in the primary circuit. The primaries of the unbalancing transformers are connected in the secondary side of the line current transformers, which is the side to which the instruments are connected, thereby avoiding disturbing the balanced condition prevailing in the instrument circuit even when the current through all three line conductors is excessive, due to a fault or other abnormal conditions.

The present invention is applicable alike to relay protective schemes embodying a minimum number of pilot conductors as well as to systems wherein no pilot wires are used and the protection is afforded from one end of the line regardless of the condition at the other end. In either case, by the use of our unbalanced ratio current transformers we adapt a system designed for protection against phase to ground faults only to likewise afford protection against faults between two of the phases or against faults involving all three phases. The attainment of the above and further objects of the present invention will be apparent from the following specification taken in conjunction with the accompanying drawing forming a part hereof.

In the drawing:

Figure 1 is a circuit diagram of our novel protective scheme; and

Figure 2 is a fragmentary circuit diagram showing the application of our system to one form of pilot wire protective circuit.

In the following description the current flow assumed is that for subtractive polarity current transformers, that is, on the diagrams if an instantaneous current is flowing into the current transformer primary from one end the instantaneous current is leaving the secondary at the same end.

Referring now more particularly to Figure 1 of the drawing, the power line is indicated at 1 and comprises the line conductors 2, 3 and 4. Three similar current transformers indicated at 5, 6 and 7 are provided for controlling the disconnection of the line from the rest of the system upon the occurrence of a fault and for operating the usual measuring instruments. The current transformers 5, 6 and 7 are connected in star, the neutral point being grounded as indicated at 8. Conductors 10, 11 and 12 extend from the current transformers 5, 6 and 7 to the usual measuring or indicating instruments 13, 14 and 15, from which they extend to the common conductor 16. A conductor 17 extends from the conductor 16 through a relay 18 to ground at 19. The relay 18 is provided with a pair of contacts indicated at 20 for controlling the disconnection of the line conductors 2, 3 and 4 from the system, the contacts closing a circuit through the usual winding of a circuit breaker C provided for the line 1. The tripping coil T of the circuit breaker C is connected in series with the normally open contacts 20 and together they are connected across a source of potential. This much of the system described is of itself effective to protect the line 1 against a failure from any one of the three phase conductors to ground. It is, however, not effective for protection against phase to phase faults, or against a three phase fault. In order to render a system such as has thus far been described effective to protect the line against faults which occur either from one phase to another or between all three phases current transformers 25 and 26 are added.

The transformer 25 is connected to have a current induced therein which is a function of the current flowing through the conductor 10, and the current transformer 26 is arranged to have a current induced therein which is a function of the current flowing through the conductor 12. While the current transformers 5, 6 and 7 are of the same ratios, the transformers 25 and 26 are of unequal ratios. As an example, they might be 2 to 1 for the transformer 25 and 4 to 1 for the transformer 26, although other unequal ratios may be used, as desired. One side of the secondary of the transformers 25 and 26 is grounded at 27 and the other side is connected by means of a conductor 28 to the conductor 17, being electrically connected to that conductor at a point indicated at 29. The burden added by the unequal ratio current transformers 25 and 26 is so small as not to affect the accuracy of the primary current of the transformers 25 and 26 for the type of instruments used in general practice. This is true, for all practical purposes, even under fault condition since the impedance of the relay 18 need not be very great.

An explanation of the manner of operation of the system will now be given. In the case of a fault between any one of the line conductors 2, 3 or 4 and ground it is apparent that the excessive current flowing through the corresponding conductor will induce a current in the corresponding transformer 5, 6 or 7, which current flows through a circuit including the corresponding conductor 10, 11 or 12 to ground at 19 passing through the winding of the relay 18. Any current that may be induced in the transformers 25 or 26 will be added at 29 to the current flowing through the relay. As a result the relay will operate and at its contact 20 complete a circuit for tripping the usual circuit breaker connecting the line 1 to the rest of the system.

An explanation will now be given of the manner of operation of the system upon the occurrence of a fault between two of the phase conductors. Assume that the fault occurs between the conductors 2 and 3 and the current at a given instant is flowing through the conductor 2 in a direction such as is indicated by the arrow 30, and is leaving the conductor 3 as indicated by the arrow 31. Since the current transformers 5, 6 and 7 all have the same ratios, the secondary currents 32 and 33 will be equal but in the opposite directions. Their vector sum is zero and they produce no current between the conductor 16 and ground 19. Current flowing through the conductor 10, however, produces a current flow through the transformer 25 which flows from the ground point 27 through the transformer 25, conductor 28 to the point 29, from which it flows to ground 19 through the winding of the relay 18. When this current reaches the proper value it will operate the relay 18. In a similar manner if the phase to phase fault had involved the line conductors 2 and 4 instead of the conductors 2 and 3, then the current flowing through the conductors 10 and 12 would again be equal and in opposite directions and would induce a current flow through the transformers 25 and 26. Since these transformers are of unequal ratios there will be a current flowing through the conductor 28, which is of a value equal to the vector sum of the current induced in the transformers 25 and 26, and this current would flow through the relay 18 causing the operation of the relay to disconnect the line 1 from the system.

In the case of a fault involving all three of the line conductors equal currents will be induced in the conductors 10, 11 and 12 by the transformers 5, 6 and 7, those currents being 120° apart. The vector sum of the currents flowing through these three conductors is zero, hence no current will flow through the conductor 17 to the relay 18 and ground. However, unequal currents will be induced in the transformers 25 and 26, those currents being 120° apart. As a result, a current equal to the vector sum of the currents induced in the transformers 25 and 26 will flow through the conductors 28 to the point 29, thence through the relay 18 to ground at 19. When this current reaches a sufficient value the relay 18 will operate to bring about the disconnection of the line 1 from the rest of the system.

Reference may now be had to Figure 2 showing a fragmentary portion of a circuit using a minimum number of pilot conductors. This circuit is the same as the circuit shown in Figure 1 except that in place of the relay 18 there is connected a current transformer 50 which has a current flow induced therein proportionate to the current flowing between the points 29 and 19. The current transformer 50 is connected at its secondary side in a circuit identical with the circuit of the corresponding current transformer indicated at 211 in Figure 14 of the pending application of Titus G. Le Clair, Serial No. 378,040 filed July 13, 1929.

This circuit extends through the current transformer and the primary side of a pilot transformer 52 to two pilot conductors 55 and 59. In this embodiment of our invention the relay 18 is connected across the secondary side of the pilot transformer 52. The primary of the transformer 52 is provided with a tap at its midpoint or may be provided with two electrically and magnetically similar primary windings. The pilot conductors 55 and 59 extend to the opposite end of the section of the line 1 where they are connected to another current transformer similar to the transformer 50 and another pilot transformer similar to the transformer 52 connected in a circuit such as shown in Figure 2. One terminal of the secondary of the current transformer 50 is connected to the mid tap of the primary of the pilot transformer 52. The end terminals of the primary of the transformer 52 are connected one to the pilot conductor 55 and the other to the pilot conductor 59 and the current transformer 50, through a resistance 60 and a condenser 61 shunting the resistance. Since the connections at the two ends of the line are the same, similar reference numerals have been used, the reference numerals at the remote end of the line being primed. The pilot circuit shown in Figure 2, that is the circuit between the secondaries of the current transformers 50 and 50', and including the pilot transformers 52 and 52' and the relays 18 and 18', does not, per se, constitute our present invention, this circuit being shown and claimed in the pending application of Titus G. Le Clair, above referred to. As is pointed out in the application of Titus G. Le Clair, the condenser 61 is preferably of a capacity equal to one-half of the capacity between the pilot conductors 55 and 59, and the resistance 60 is preferably of a value equal to the resistance of one of the pilot conductors 55 or 59. We do claim patentable novelty in the combination of this circuit with the unequal ratio current transformers. By this arrangement current flows to ground from the point 29 through the primary of the current transformer 50 even during balanced conditions. Upon the occurrence of overloads this current becomes excessive and may be used to actuate the relays 18 or 18', as the case may be. Upon the occurrence of a fault resulting in the flow of excessive current through the line conductors of the section being protected, a large current will be induced in the secondary of the current transformer 50 or 50', or both. This is true regardless of whether the fault is from phase to ground, or from phase to phase, or between all three phases, as was pointed out above in connection with the discussion of the operation of the system shown in Figure 1. Therefore the system will function in its intended manner whether the fault is between phases or between one phase conductor and ground. In such a system it is intended that the relays 18 and 18' should not be energized upon the occurrence of a "through" fault that is, upon the occurrence of a fault external to the section of the line being protected but resulting in an excessive current flow in the same direction at both ends of the line. The line current transformers 5, 6 and 7, and the corresponding transformers 5', 6', and 7' are so arranged at the two ends of the line section that the currents induced therein by current that flows into the section at one end and out again at the other in the same direction will produce current in the secondaries of the transformers 50 and 50' which are of opposite polarity with respect to one another. That is, under such circumstances current will flow from the upper to the lower terminal of the secondary of the transformer 50 at the instant that it is flowing from the lower to the upper terminal of the transformer 50', and will reverse in direction in the current transformer 50 at the instant that it reverses in direction in the current transformer 50'. Reference may be had to the application of Titus G. Le Clair, above referred to, for a discussion of the theory of operation of this circuit. Suffice it to say that under conditions of a through fault, when the polarities of the secondaries of the transformers 50 and 50' are as above stated there will be current flowing through the two halves of the primary windings of the pilot transformers 52 and 52' said currents being equal and of opposite effect whereby no voltage will be induced in the secondaries of the pilot transformers, and the relays 18 and 18' will, therefore, not operate. This means that regardless of the magnitude of a "through" fault the relays 18 and 18' will not operate and the section of the line will not be isolated. This is as it should be.

*Fault fed equally from both ends of the power circuit*

If a fault occurs between the two ends of the section being protected and the section is being fed from both ends thereof, the relative directions of current flow at the two ends of the section will be reversed as compared to the relative direction under conditions of a through fault. Under such circumstances the direction of current flow through the secondary of the current conformer 50 will, at all times, be the same as the direction of current flow through the secondary of the transformer 50', that is, at an instant when the current is flowing from the lower to the upper terminal of the secondary of the transformer 50 it will also be flowing from the lower to the upper terminal of the secondary of the transformer 50'. Under these conditions the potentials at the two ends of the pilot wire 59 will be the same and no current will flow through this wire. Likewise, the potentials at the two ends of the pilot wire 55 will be the same and no current will flow through this wire. Therefore, only one primary coil of each of the two pilot transformers 52 and 52' will be energized. Since no neutralizing current flows through the other one of the primary coils of each pilot transformer the secondaries thereof will be energized to energize the relays 18 and 18' to trip the circuit breakers at both ends of the line.

*Fault fed from only one end of the power circuit*

Assume now that a fault on the section being protected is fed from only one end of the line. For the sake of the discussion assume that it is fed from the left hand end. It may be shown that under these conditions three-fourths of the current flowing through the secondary of the transformer 50 will flow through the right hand primary winding of the pilot transformer 52, and one-fourth of the current will flow through the left hand primary coil of this pilot transformer and through the two primary coils of the pilot transformer 52' in series. The left hand half of the primary winding of the pilot transformer 52 will buck the right hand half and, being of only one-third the magnitude of the current flowing through the right hand half of the primary of this transformer there will be a resulting magnetic effect equivalent to a current flow through one of the two primary coils and of magnitude equivalent to half of the secondary current of the transformer 50'. The current flowing through the two primary coils of the pilot transformer 52' are of cumulative effect and being each of a value of one-fourth of the secondary current of the transformer 50 they produce an effect equivalent to that produced by half of the current of the secondary of the transformer 50 flowing through only one of the primary sections. This is the same effect that is produced in the pilot transformer 52. When this current reaches a sufficient value the relays 18 and 18' will both operate to isolate the section of the line under consideration. It is to be noted that both of the relays 18 and 18' operate even though current is being fed to the fault from only one side of the section being protected.

It may be seen that by the addition of the unequal ratio current transformers 25 and 26 we have provided a simple arrangement whereby systems of fault protection designed to take care of phase to ground faults only may be readily changed to afford protection against interphase faults as well as phase to ground faults, this change being effected without in any way altering the circuit for the measuring instruments usually provided.

In compliance with the requirements of the patent statutes we have herein shown and described a few preferred embodiments of our invention. It is, however, to be understood that the invention is not limited to the precise embodiments shown, the same being merely illustrative of the invention. What we consider new and desire to secure by Letters Patent is:

1. In a polyphase alternating current system wherein line current transformers are connected to measuring instruments for measuring the energy flow and wherein electroresponsive means for isolating the line is energized in accordance with the excess current flowing through one of the line current transformers upon the occurrence of a ground fault on only one of the line conductors, means for energizing the electroresponsive means responsive to an excess current flow in two or more of the line conductors, said last means comprising current transformers of unequal ratio having their primaries connected respectively in circuit with two of the line current transformers and their secondaries connected to furnish current to the electro responsive means.

2. In a polyphase electric system wherein a plurality of like ratio current transformers are connected to the respective line conductors and measuring instruments are connected in circuit with the secondaries of the transformers, and electro responsive means for isolating the line is connected in circuit with said transformers to receive a current therefrom equal to the vector sum of the currents flowing through the respective transformer secondaries, means for energizing the electro responsive means upon the occurrence of a fault involving more than one of the line conductors and resulting in a balancing current flow through the corresponding transformer secondaries, said means comprising a pair of unequal ratio current transformers having their primaries connected in series circuit with the measuring instruments, whereby the reading of the instruments is unaffected, and the secondaries being connected to furnish current to the electro responsive means.

3. In a polyphase power line, current transformers for measuring the current flow through the respective line conductors, measuring instruments connected in circuit with the secondaries of the transformers, electro responsive means for disconnecting the line, said means being connected in circuit to have a current flowing therethrough equal to the vector sum of the current flowing through the respective transformers, and a pair of unequal ratio current transformers for feeding to said means an additional current equal to the vector sum of the current flowing through two of the first mentioned current transformers times the respective ratios of said last mentioned transformers.

4. In a polyphase alternating current system, a polyphase line, electro responsive means for disconnecting the line, and means for operating said first means upon the occurrence of a fault involving more than one of the line conductors, said last means including a number of similarly connected equal ratio transformers each energized in accordance with the current flowing in different ones of the line conductors and a number of unequal ratio current transformers each energized in accordance with the current flowing in different ones of the line conductors.

5. In an electric system, a polyphase power line, an electro-responsive device, a plurality of equal ratio current transformers having a current flow therethrough proportionate to the current flowing through certain of the line conductors, and a plurality of unequal ratio current transformers having a current flow therethrough proportionate to the current through certain of the line conductors, all of said transformers furnishing the energy to operate the electro-responsive device.

6. In combination with a three phase line, five current transformers the secondaries of which are connected in parallel, the primaries of three of the transformers being connected in the respective line circuits of the polyphase line, the primary of one of the remaining transformers being connected in series with the secondary of one of the three line connected transformers and the primary of the fifth transformer being connected in series with the secondary of another of the three line connected transformers.

7. In combination with a three phase line, five current transformers the secondaries of which are connected in parallel, the primaries of three of the transformers being connected in the respective line circuits of the polyphase line, the primary of one of the remaining transformers being connected in series with the secondary of one of the three line connected transformers and the primary of the fifth transformer being connected in series with the secondary of another of the three line connected transformers, and an electro responsive device connected in parallel with the five parallel connected secondaries.

8. In combination with a polyphase line, a plurality of similar ratio current transformers the primaries of which are responsive to the currents in the respective line conductors, a plurality of dissimilar ratio current transformers the primaries of which are responsive to the line current in certain of the same line conductors, the secondaries of all of the transformers being connected in parallel, metering means in the secondary circuits of each of the first mentioned transformers, and a protective device connected in parallel with all of said secondaries and supplied with current therefrom.

9. In combination with a polyphase line, protecting apparatus comprising at each end of the line means for producing a current flow which is a function of the resultant of different constant multiples of the currents flowing through the respective phase conductors at the adjacent end of the line, a two coil winding at each end of the line, a circuit for sending through one coil of each of said windings a current which is a function of the resultant current produced at the adjacent end of the line, and an additional circuit including pilot conductors for sending through each of the other coils a current which is a function of the vector sum of the resultant currents produced at both ends of the line, switching means controlled by the respective windings for protecting the line, the effects of the currents in the two circuits being normally equal and opposite.

10. In combination with a polyphase line, protecting apparatus comprising at each end of the line means for producing a current flow which is a function of the resultant of different constant multiples of the currents flowing through the respective phase conductors at the adjacent end of the line, a pair of coil sections at each end of the line, a series circuit including one section of each pair and both of the first named current flow producing means, the other coil section of each pair of sections being connected to its adjacent current flow producing means, the effects of both sections of each pair being normally differential, and switching means operated by each pair of coils.

11. In combination with a polyphase line, protecting apparatus at each end of the line each comprising a current transformer, means for inducing therein a current flow which is a function of the resultant of different constant multiples of the currents flowing through the respective phase conductors at the adjacent end of the line, a pilot transformer having two primary winding portions and a secondary, and line protecting means connected across the secondary; the two current transformers being connected in a series loop including one primary portion of each of the pilot transformers, the other primary portion of each pilot transformer being connected across the adjacent current transformer.

12. In combination with a polyphase line, protecting apparatus at each end of the line each comprising means for producing a current flow which is a function of the resultant of different constant multiples of the currents flowing through the respective phase conductors at the adjacent end of the line, a pilot transformer having two primary winding portions and a secondary, and line protecting means connected across the secondary; the two first named means being connected in a series loop including one primary portion of each of the pilot transformers, the other primary portion of each pilot transformer being connected across the adjacent current producing means, the effect of the current flow through both primary coil portions being normally differential.

13. In combination with a polyphase line, protecting apparatus at each end of the line each comprising means for producing a current flow which is a function of the resultant of different constant multiples of the currents flowing through the respective phase conductors at the adjacent end of the line, a pilot transformer having two primary winding portions and a secondary, and line protecting means connected across the secondary; the two first named means being connected in a series loop including one primary portion of each of the pilot transformers, the other primary portion of each pilot transformer being connected across the adjacent current producing means by a connection including a resistor and a condenser, the effect of the current flow through both primary coil portions being normally differential.

14. In combination with a polyphase line, protecting apparatus at each end of the line each comprising means for producing a current flow which is a function of the resultant of different constant multiples of the currents flowing through the respective phase conductors at the adjacent end of the line, a pair of electromagnetically coupled coil portions and line protecting means controlled by the joint resulting action of the two coupled coil portions; a pilot circuit between the two ends of the line and including the first named means of the apparatus at both ends of the line and one of the coupled windings at one end of the line and one of the coupled windings at the other end of the line, the second of the coupled windings at the respective ends of the line being connected across the associated first named means.

15. In combination with a polyphase line, protecting apparatus at each end of the line each comprising means for producing a current flow which is a function of the resultant of different constant multiples of the currents flowing through the respective phase conductors at the adjacent end of the line, a pair of electromagnetically coupled coil portions and line protecting means controlled by the joint resulting action of the two coupled coil portions; a pilot circuit between the two ends of the line and including the first named means of the apparatus at both ends of the line and one of the coupled windings at one end of the line and one of the coupled windings at the other end of the line, the second of the coupled windings at the respective ends of the line being connected across the associated first named means by a connection including a resistor and a capacity for counteracting the resistance and capacity of the pilot connection between the two ends of the line.

16. In combination with a polyphase line, a pilot circuit extending between the two ends of the line, means controlled over a local circuit at one end of the line for producing a magnetic action which is a function of the resultant of different constant multiples of the currents flowing through the respective phase conductors at one end of the line, means at the same end of the line and controlled over the pilot circuit for producing a magnetic action which is a function of the resultant of different constant multiples of the currents flowing through the respective phase conductors at the opposite end of the line, and a set of contacts controlling the polyphase line and controlled by the two magnetic actions, said magnetic actions being normally equal and of opposite effects whereby the contacts are operated upon a failure of the pilot circuit and are also operated upon a reversal of one of the resultants with respect to the other resultant.

17. In combination with a three phase line, five current transformers the secondaries of which are connected in parallel, the primaries of three of the transformers being connected in the respective line circuits of the polyphase line, the primary of one of the remaining transformers being connected in series with the secondary of one of the three line connected transformers and the primary of the fifth transformer being connected in series with the secondary of another of the three line connected transformers, said two last mentioned transformers being of different transformation ratios.

18. In combination with a three phase line, five current transformers the secondaries of which are connected in parallel, the primaries of three of the transformers being connected in the respective line circuits of the polyphase line, the primary of one of the remaining transformers being connected in series with the secondary of one of the three line connected transformers and the primary of the fifth transformer being connected in series with the secondary of another of the three line connected transformers, said two last mentioned transformers being of different transformation ratios.

TITUS G. LE CLAIR.
CHARLES M. GROSS.